United States Patent [19]

Dotany

[11] Patent Number: 5,083,887

[45] Date of Patent: Jan. 28, 1992

[54] HELICAL CUTTING TOOL

[75] Inventor: Amram Dotany, Kfar Sava, Israel

[73] Assignee: Abraham Cohen, Hasharon, Israel

[21] Appl. No.: 239,728

[22] Filed: Sep. 2, 1988

[30] Foreign Application Priority Data

Mar. 2, 1988 [IL] Israel ........................................ 85606

[51] Int. Cl.$^5$ ............................................. B26D 1/00
[52] U.S. Cl. ........................................ 407/59; 407/48; 407/58; 407/61
[58] Field of Search ..................... 407/34, 47, 48, 53, 407/56, 58, 59, 61, 62, 63

[56] References Cited

U.S. PATENT DOCUMENTS

| | | | |
|---|---|---|---|
| 2,549,251 | 4/1951 | Skelton | 407/59 |
| 4,072,438 | 2/1978 | Powers | 407/11 |
| 4,093,392 | 6/1978 | Hopkins | 407/59 |
| 4,182,587 | 1/1980 | Striegl | 407/59 |
| 4,648,755 | 3/1987 | Stashko | 407/59 |
| 4,681,485 | 7/1987 | Koelewijn | 407/59 |
| 4,708,537 | 11/1987 | Elka | 407/59 |
| 4,714,383 | 12/1987 | Shimomura | 407/59 |
| 4,790,693 | 12/1988 | Koblesky | 407/59 |

*Primary Examiner*—Bruce M. Kisliuk
*Assistant Examiner*—John Marlott
*Attorney, Agent, or Firm*—Benjamin J. Barish

[57] ABSTRACT

A helical cutting tool having a plurality of cutting inserts of quadrilateral configuration removably attached to seats formed in the cutting tool, with each insert including a cutting edge extending in the axial direction bounded on opposite sides by a pair of parallel, radially-extending edges. The cutting inserts are disposed in a helical array in which the cutting edge of each insert is spaced in the circumferential direction from the seat of the next adjacent insert and is in overlapping relationship in the axial direction with the cutting edge of the next adjacent insert, and in which the radially-extending edges of each insert are in overlapping relation with the radially-extending edges of the adjacent inserts, such that the cutting edges of all the inserts define a continuous, non-interrupted, cutting line of stepped configuration.

18 Claims, 2 Drawing Sheets

HELICAL CUTTING TOOL

BACKGROUND OF THE INVENTION

The present invention relates to helical cutting tools, particularly to the type having helical arrays of cutting inserts removably attached to seats formed in the cutting tool.

The conventional helical cutting tool of this type usually includes a plurality of helical arrays of cutting inserts, in which the helical angle is relatively small, being usually from 10° to 25°, and in which the cutting edge of each insert is axially spaced from the cutting edge of the next adjacent insert. The inserts of each helix are thus in staggered relationship such that two (or more) rows of inserts are necessary to produce one complete cutting edge. Accordingly, a cutting tool having four helical arrays of cutting inserts effectively produces two complete cutting edges.

In such conventional cutting tools, the cutting edges of the inserts are in direct contact with the workpiece for a relatively small proportion of the surface of the cutting tool embraced by the workpiece. For example, in a typical helical cutting tool having four helical rows of inserts disposed at a helical angle of 15°, the cutting edges of the inserts are in direct contact with the workpiece for only about 25% of the semi-cylindrical surface of the cutting tool embraced by the workpiece during the cutting operation. This results in significant chattering, hammering and vibration during the cutting operation. Moreover, it permits relatively low workpiece feed, because the workpiece feed rate depends on the number of effective complete cutting edges, rather than on the number of helical rows of cutting inserts, included in the tool.

An object of the present invention is to provide a helical cutting tool having advantages in the above respects.

BRIEF SUMMARY OF THE INVENTION

According to the present invention, there is provided a helical cutting tool having an outer surface of cylindrical configuration and a plurality of cutting inserts of quadrilateral configuration removably attached to seats cut into the outer surface of the cutting tool. Each of the seats occupies a plane extending radially of the cutting tool, and each of the inserts is removably secured in its respective seat by a fastener extending tangentially with respect to the cutting tool. Each of the inserts includes a straight cutting edge extending in the general axial direction with respect to the cutting tool and bounded on opposite sides by a pair of parallel straight edges extending radially of the cutting tool. The cutting inserts are disposed in a helical array in which the cutting edge of each insert, with respect to the cutting tool, is spaced in the circumferential direction from the seat of the next adjacent insert and is in overlapping relationship in the axial direction with the cutting edge of the next adjacent insert, and the radially-extending edges of each insert are in overlapping relation with the radially-extending edges of the adjacent inserts, such that the cutting edges of all the inserts define a continuous, non-interrupted, cutting line of stepped configuration.

In the preferred embodiment of the invention described below, each of the inserts is formed with four straight cutting edges on one side, with a base on the opposite side, and with four walls tapering inwardly from their cutting edges to their base. The cutting inserts are disposed in a helical array in which one cutting edge of each insert serves as the effective cutting edge for the respective insert when all the inserts are secured to the cutting tool, whereas the remaining cutting edges are non-effective cutting edges.

This arrangement is to be distinguished from the existing cutting tools using conventional quadrilaterial inserts wherein the cutting edge of each insert is axially spaced from the seat of the next adjacent insert. This arrangement, as will be described more particularly below, is also to be distinguished from known cutting tools having triangular inserts with the cutting inserts in overlapping relation axially of the insert.

As will be described below, the novel arrangement permits the cutting inserts to be disposed and dimensioned such that their cutting edges are in direct contact with the workpiece for a very high percentage of the surface of the cutting tool embraced by the workpiece. For example, whereas in a cutting tool of conventional construction the cutting edges of the inserts are in direct contact with the workpiece for approximately 25% of the surface of the cutting tool embraced by the workpiece, in a cutting tool constructed in accordance with the present invention this percentage may be increased easily to approximately 85% of the surface of the cutting tool embraced by the workpiece. By thus providing such a large contact surface between the cutting edges and the workpiece, chatter, hammering and vibration are substantially reduced. In addition, this arrangement permits faster workpiece feed because of the higher removal rate.

This arrangement also has important advantages over the known cutting tools including triangular inserts having cutting edges in overlapping relation in the axial direction such as described in U.S. Pat. No. 4,648,755. In this known triangular insert arrangement, the inserts are relatively weak, particularly at their corners, and are easily broken or chipped. The arrangement of the present invention, however, by using quadrilateral (e.g., square or rhomboidal) inserts each having a pair of parallel radially-extending edges on opposite sides of the axially-extending cutting edge, which radially-extending edges in adjacent inserts are in overlapping relation, provides a much more durable structure.

The cutting tool constructed in accordance with the present invention also provides a number of important advantages over cutting tools having solid cutting edges, in that the chips are of reduced width (corresponding to the width of each cutting insert), thereby producing less axial load on the cutting tool, as well as permitting easier repair and maintenance of the cutting tool by merely replacing the cutting inserts whenever necessary, rather than the whole cutting tool.

According to another important feature of the invention of the present application, the inserts form a helical angle of 40–60°, which is not achievable in the conventional cutting tools having rows of staggered cutting inserts. Such a large helical angle permits faster workpiece feed.

According to a further feature in the preferred embodiment of the invention described below, the cutting edges of the cutting inserts form an inclination angle of 8-12 degrees with respect to the longitudinal axis of the tool; preferably, the inclination angle is approximately 10°. In addition, the cutting edge of each cutting insert forms a tilt angle of 15-35° with respect to the cutting edge of the next adjacent insert.

Preferably, the cutting insert is of the single-sided type, each being formed with four cutting edges on one side, with a base on the opposite side, and with four walls tapering inwardly from their cutting edges to their bases; preferably the taper is 7-15°. It will be appreciated, however, that the invention could also be advantageously used with cutting inserts of the double-sided type, wherein each is formed with four cutting edges on both sides and with straight walls joining the cutting edges of both sides.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
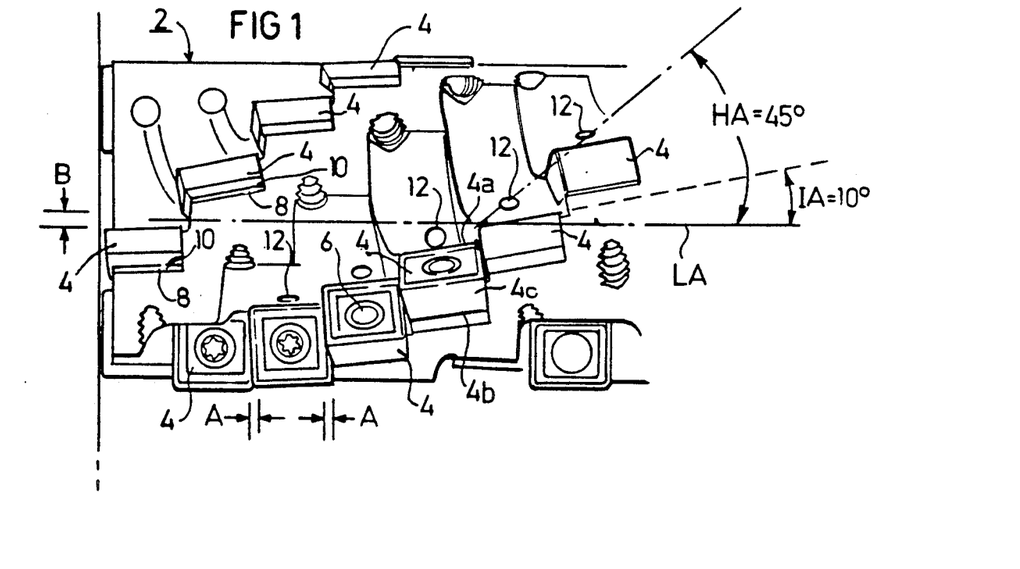
FIG. 1 illustrates one form of helical cutting tool constructed in accordance with the present invention, the cutting tool having a left-hand spiral for right-hand cutting.

With reference to FIG. 1, there is illustrated a helical cutting tool, generally designated 2, having an outer surface of cylindrical configuration and a plurality of arrays of cutting inserts 4 removably attached by screws 6 to seats 8 formed in the cutting tool, and occupying a plane extending radially of. Preferably, a shim 10 is inserted between the base of each insert 4 and its respective seat 8. Also, a cooling hole 12 is formed through the cutting tool adjacent each of the seats 8 to dissipate the heat generated during the cutting operation.

The cutting inserts 4 are all of identical construction. They are of quadrilateral configuration, preferably square, but could also be rhomboidal. In the example illustrated in FIG. 1, they are of the single-sided, positive type, being formed with four straight cutting edges 4a on one side, a flat base 4b on the opposite side, and four tapering walls 4c tapering inwardly from their cutting edges to their bases. Preferably, the taper angle is 7-15°. While FIG. 1 illustrates the cutting inserts 4 as being of the single-sided type, it will be appreciated that they could be of the double-sided type, formed with four cutting edges on both sides and with straight walls joining the cutting edges of both sides.

Figure 5:
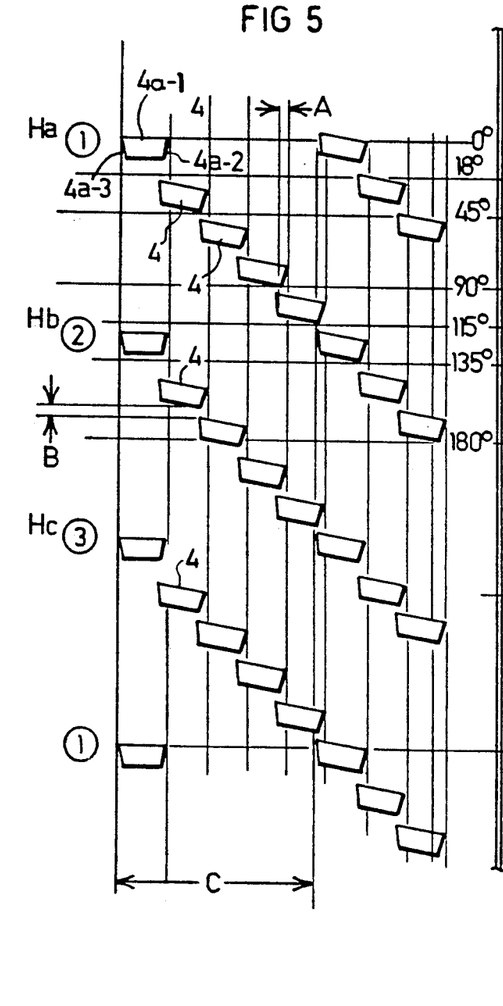
FIG. 5 is a two-dimensional projection of the cutting inserts of a helical cutting tool constructed in accordance with FIG. 1 of the present application.

FIG. 5 more particularly illustrates the side of the inserts containing the four cutting edges 4a. It will be seen that the effective cutting edge, identified as 4a-1, extends axially of the cutting tool and is bounded on opposite sides by a pair of parallel, radially-extending non-effective cutting edges 4a-2, 4a-3. It will also be seen that the radially-extending non-effective cutting edges 4a-2, 4a-3 of each insert are in overlapping relation with the radially-extending non-effective cutting edges of the adjacent inserts.

As also shown in FIG. 5, and also in FIG. 1, the effective cutting edge 4a-1 of each insert is spaced in the circumferential direction from the seat 8 of the next adjacent insert, and is in overlapping relation in the axial direction with the effective cutting edge of the next adjacent edge. The overlapping relation in the axial direction is indicated by dimension "A" in FIG. 1, and the spacing in the circumferential direction is indicated by dimension "B".

This arrangement of the cutting inserts defines a continuous, non-interrupted cutting line of stepped configuration having a helical angle (HA), which in this case is 45°.

Figure 3:
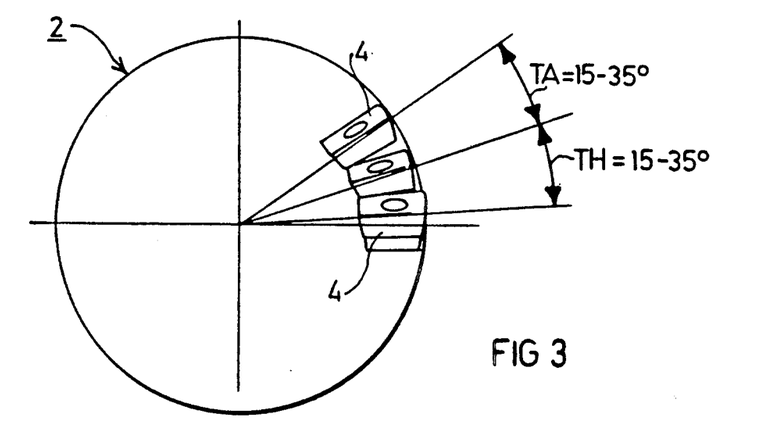
FIG. 3 is an end view diagrammatically illustrating the disposition of the cutting inserts in the cutting tool of FIG. 1.

In the arrangement illustrated in FIG. 1, the cutting edges 4a form an inclination angle (IA) of 8-12°, preferably approximately 10°, with respect to the longitudinal axis 14 of the cutting tool. As shown in FIG. 3, the cutting edge 4a of each insert forms a tilt angle (TA) of 15-35° with respect to the cutting edge of the next adjacent insert. The inclination angle IA and the tilt angle TA depend to a great extent on the material to be cut. As one example, the inclination angle IA may be approximately 10°, and the tilt angle TA may be approximately 25%.

Figure 2:
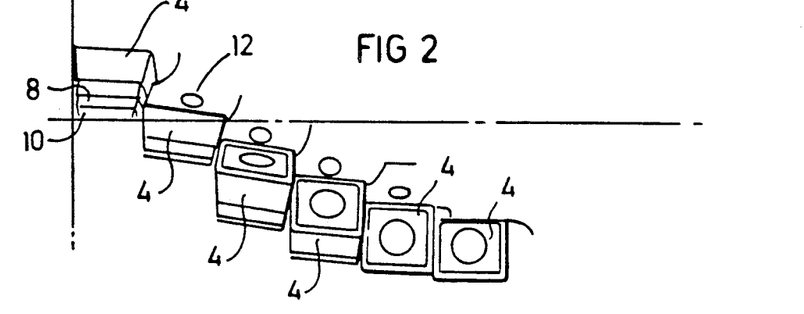
FIG. 2 is a fragmentary view illustrating a similar tool but formed with a right-hand spiral for right-hand cutting.

FIG. 2 illustrates a helical cutting tool of similar construction as in FIG. 1, except that the cutting inserts are arranged to define a right-hand helix of 45%, with right-hand cutting, rather than a left-hand helix (also of 45%) with right-hand cutting illustrated in FIG. 1.

Figure 4:
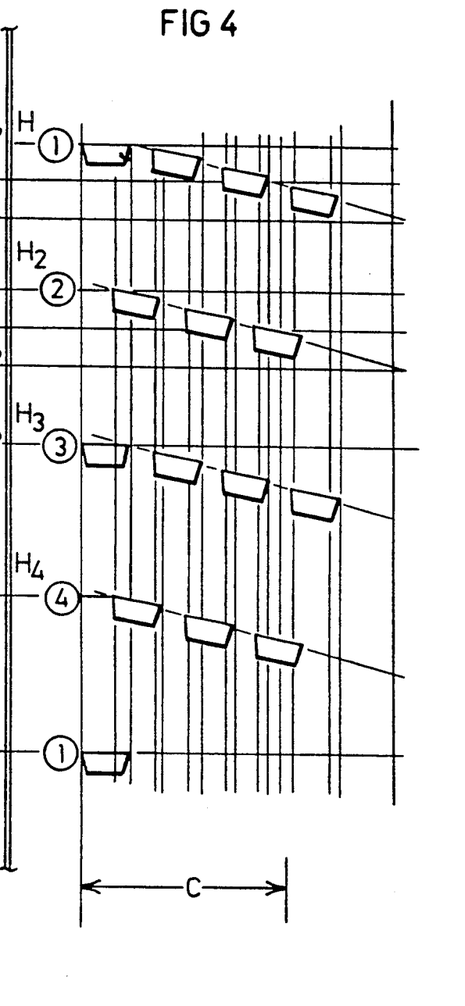
FIG. 4 is a projection of cutting inserts in a conventional helical cutting tool.
Figure 4A:
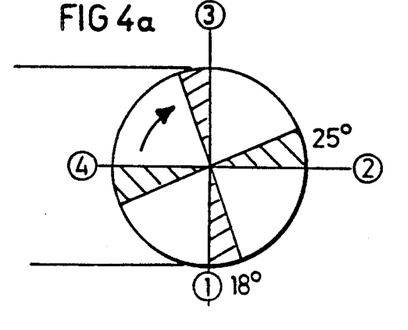
FIG. 4a is a diagram illustrating the relatively low percentage of the cutting edges in such a cutting tool in direct contact with the workpiece embracing the cutting tool.
Figure 5A:
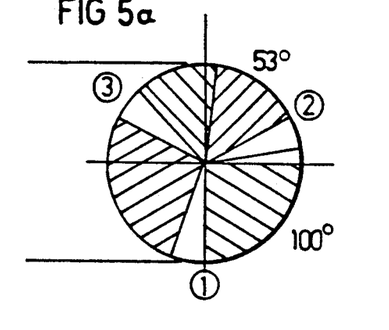
FIG. 5a is a diagram illustrating the relatively high percentage of the cutting edges in direct contact with the workpiece embracing the cutting tool during a cutting operation.

Some of the important advantages produced by the helical cutting tool of the present invention over the existing tools can be seen by comparing the diagrams of FIGS. 4 and 4a relating to tools of conventional construction, with the diagrams of FIGS. 5 and 5a relating to a tool constructed in accordance with FIG. 1 (or FIG. 2) of the present application. FIGS. 4 and 5 are two-dimensional projections of the cutting inserts in a conventional tool and in the novel tool of FIG. 1, respectively, whereas the diagrams of FIGS. 4a and 5a illustrate the respective percentages of the surfaces of the cutting tool embraced by the workpieces which are in direct contact with the workpieces. In both cases, the cutting depth, indicated by dimension "C", is 40 mm.

In the conventional cutting tool, as represented by the diagrams of FIGS. 4 and 4a, there are four helical rows $H_1$-$H_4$ of cutting inserts 14, the inserts of each row being circumferentially spaced from each other to provide a staggered relationship, such that two rows of inserts effectively produce one cutting line; thus, the four rows of inserts 14 in FIG. 4 produce two cutting lines. In FIG. 4, each helix forms a helical angle of 15°.

In the novel construction of FIG. 1, as represented by the diagrams of FIGS. 5 and 5a, each of the cutting inserts 4 is spaced in the circumferential direction by the distance "B" (FIG. 1) from the seat of the next adjacent insert, and is in overlapping relation in the axial direction, by the dimension "A" (FIG. 1) with the cutting edge of the next adjacent insert, as described above with respect to FIG. 1. In this example, there are three helixes Ha-Hc, each forming a helical angle of 45°. The diameter D of the cutting tool in both cases is the same, e.g., 40 mm.

During a cutting operation, the workpiece WP embraces the cutting tool 2 for one-half of its outer circumference, as shown in FIGS. 4a and 5a, respectively. The sectioned portion of FIG. 4a illustrates the portion of the cutting edges of the cutting inserts 14 in direct contact with the workpiece during the cutting operation when using the conventional tool of FIG. 4, whereas the sectioned portion of the diagram of FIG. 5a illustrates the portion of the cutting edges in direct with the workpiece when using the cutting tool illustrated in FIG. 1 (or FIG. 2) as represented by the diagram of FIG. 5.

Thus, when using the conventional cutting tool, it will be seen that the cutting edges of the three inserts 14 in the first helical row $H_1$ directly contact the workpiece only for an arc of 18° whereas the cutting inserts of helical row $H_2$ directly contact the workpiece only for an arc of 25°. Thus, for the 180° of embracement of the cutting tool by the workpiece, the cutting edges of the cutting tool directly contact the workpiece only for a total arc of 43°, which is approximately 25% of the total 180° of the cutting tool.

In the overlapping relationship of cutting inserts illustrated in FIG. 1 of the drawings, as represented by the diagram of FIG. 5, it will be seen that the cutting inserts 4 of helix $H_a$ are in direct contact with the workpiece for approximately 100°, and that with respect to the remaining 80° of the cutting tool embraced by the workpiece, the cutting edges of the cutting inserts in helix $H_b$ directly contact the workpiece for approximately 53°. Thus, of the 180° of the cutting tool embraced by the workpiece, the cutting edges of the cutting inserts directly contact the workpiece for approximately 153°, which is approximately 85% of the total 180° of the cutting tool embraced by the workpiece.

It will thus be seen that the construction of the cutting tool illustrated in FIG. 1 of the drawings provides a much larger contact surface between the cutting edges and the workpiece. This arrangement thus reduces chatter, hammering and vibration, and permits faster workpiece feed because of the higher rate of removal of material. Another advantage is that the arrangement permits the use of identical inserts, thereby simplifying maintenance and inventories to be kept in stock.

While the invention has been described with respect to one preferred embodiment, it will be appreciated that many variations may be made. For example, the cutting inserts could be of the double-sided type formed with four cutting edges on both sides and with straight walls joining the cutting edges of both sides, to enable the use of both sides. In addition, instead of square configuration, the cutting inserts could also be of rhomboidal. Many other variations, modifications and applications of the invention will be apparent.

What is claimed is:

1. A helical cutting tool having an outer surface of cylindrical configuration and a plurality of cutting inserts of quadrilateral configuration removably attached to seats formed in the outer surface of the cutting tool; each of said seats occupying a plane extending radially of the cutting tool, and each of said inserts being removably secured in its respective seat by a fastener extending parallel to the tangent of the cutting tool; each of the inserts including a straight cutting edge extending in the general axial direction with respect to the cutting tool and bounded on opposite sides by a pair of parallel straight edges extending radially of the cutting tool; each of said inserts being of the single-sided type, being formed with four cutting edges on one side, with a base on the opposite side, and with four walls tapering inwardly from their cutting edges to their base; said cutting inserts being disposed in a helical array in which the cutting edge of each insert, with respect to the cutting tool, is spaced in the circumferential direction from the seat of the next adjacent insert and is in overlapping relationship in the general axial direction with the cutting edge of the next adjacent insert, and the radially-extending edges of each insert are in overlapping relation with the radially-extending edges of the adjacent inserts, such that said cutting edges of all the inserts define a continuous, non-interrupted, cutting line of stepped configuration.

2. The cutting tool according to claim 1, wherein said inserts form a helical angle of 40-60°.

3. The cutting tool according to claim 1, wherein the cutting inserts are disposed and dimensioned such that their cutting edges are in direct contact with the workpiece for over 50% of the surface of the cutting tool embraced by the workpiece during a cutting operation.

4. The cutting tool according to claim 3, wherein the cutting inserts are dimensioned such that their cutting edges are in direct contact with the workpiece for approximately 85% of the surface of the cutting tool embraced by the workpiece.

5. The cutting tool according to claim 1, wherein the angle of tapering of said four walls is 7-15°.

6. The cutting tool according to claim 1, wherein said cutting inserts are all of identical configuration.

7. The cutting tool according to claim 1, further including a shim between each cutting insert and its seat.

8. The cutting tool according to claim 1, wherein a cooling hole is formed through the cutting tool adjacent its seat.

9. The cutting tool according to claim 1, wherein the cutting tool is formed with a plurality of said helical arrays of cutting inserts.

10. The cutting tool according to claim 9, wherein said helical arrays form left-hand helixes of 45°.

11. The cutting tool according to claim 9, wherein said array of cutting inserts form right-hand helixes of 45°.

12. A helical cutting tool having an outer surface of cylindrical configuration and a plurality of cutting inserts of quadrilateral configuration removably attached to seats formed in the outer surface of the cutting tool; each of said seats occupying a plane extending radially of the cutting tool, and each of said inserts being removably secured in its respective seat by a fastener extending parallel to the tangent of the cutting tool; each of the inserts including a straight cutting edge extending in the general axial direction with respect to the cutting tool and bounded on opposite sides by a pair of parallel straight edges extending radially of the cutting tool; said cutting inserts being disposed in a helical array in which the cutting edge of each insert, with respect to the cutting tool, is spaced in the circumferential direction from the seat of the next adjacent insert and is in overlapping relationship in the general axial direction with the cutting edge of the next adjacent insert, and the radially-extending edges of each insert are in overlapping relation with the radially-extending edges of the adjacent inserts, such that said cutting edges of all the inserts define a continuous, non-interrupted, cutting line of stepped configuration, the cutting edges of the cutting inserts forming an inclination angle of 8-12° with respect to the longitudinal axis of the tool.

13. The cutting tool according to claim 12, wherein the cutting edges of the cutting inserts form an inclination angle of approximately 10° with respect to the longitudinal axis of the tool.

14. A helical cutting tool having an outer surface of cylindrical configuration and a plurality of cutting inserts of quadrilateral configuration removably attached to seats formed in the outer surface of the cutting tool; each of said seats occupying a plane extending radially of the cutting tool, and each of said inserts being removably secured in its respective seat by a fastener extending parallel to the tangent of the cutting tool; each of the inserts including a straight cutting edge extending in the general axial direction with respect to the cutting tool and bounded on opposite sides by a pair of parallel straight edges extending radially of the cutting tool; said cutting inserts being disposed in a helical array in which the cutting edge of each insert, with respect to the cutting tool, is spaced in the circumferential direction from the seat of the next adjacent insert and is in overlapping relationship in the general axial direction with the cutting edge of the next adjacent insert, and the radially-extending edges of each insert are in overlapping relation with the radially-extending edges of the adjacent inserts, such that said cutting edges of all the inserts define a continuous, non-interrupted, cutting line of stepped configuration, the cutting edges of the cutting inserts forming a tilt angle of 15-35° with respect to the cutting edge of the next adjacent cutting insert.

15. A helical cutting tool having an outer surface of cylindrical configuration and a plurality of cutting inserts of quadrilateral configuration removably attached to seats formed in the outer surface of the cutting tool; each of said seats occupying a plane extending radially of the cutting tool, and each of said inserts being removably secured in its respective seat by a fastener extending parallel to the tangent of the cutting tool; each of the inserts including a straight cutting edge extending in the general axial direction with respect to the cutting tool and bounded on opposite sides by a pair of parallel straight edges extending radially of the cutting tool; said cutting inserts being disposed in a helical array in which the cutting edge of each insert, with respect to the cutting tool, is spaced in the circumferential direction from the seat of the next adjacent insert and is in overlapping relationship in the general axial direction with the cutting edge of the next adjacent insert, and the radially-extending edges of each insert are in overlapping relation with the radially-extending edges of the adjacent inserts, such that said cutting edges of all the inserts define a continuous, non-interrupted, cutting line of stepped configuration, the cutting inserts being of square configuration.

16. A helical cutting tool having an outer surface of cylindrical configuration and having a plurality of cutting inserts of quadrilateral configuration removably attached to seats formed in the outer surface of the cutting tool each of said seats occupying a plane extending radially of the cutting tool, and each of said inserts being removably secured in its respective seat by a fastener extending tangentially with respect to the cutting tool; each of the inserts being formed with four straight cutting edges on one side, with a base on the opposite side, and with four walls tapering inwardly from their cutting edges to their base; said cutting inserts being disposed in a helical array in which one cutting edge of each insert serves as the effective cutting edge for the respective insert when all the inserts are secured to the cutting tool, whereas the remaining cutting edges are non-effective cutting edges; said effective cutting edge of each insert, with respect to the cutting tool, extending in the general axial direction, being bounded on opposite sides by a pair of parallel, non-effective cutting edges extending radially of the cutting tool, being spaced in the circumferential direction from the seat of the next adjacent insert, and being in overlapping relationship in the axial direction with the cutting edge of the next adjacent insert; the radially-extending non-effective cutting edges of each insert being in overlapping relation with the effective cutting edges of the adjacent inserts, such that said effective cutting edges of all the inserts define a continuous, non-interrupted, cutting line of stepped configuration.

17. The cutting tool according to claim 16, wherein said inserts form a helical angle of 40-60°, and their cutting edges form an inclination angle of 8-12° with respect to the longitudinal axis of the tool.

18. The cutting tool according to claim 16, wherein the cutting tool is formed with a plurality of said helical arrays of cutting inserts.

* * * * *

UNITED STATES PATENT AND TRADEMARK OFFICE
CERTIFICATE OF CORRECTION

PATENT NO. : 5,083,887
DATED : January 28, 1992
INVENTOR(S) : Amram Dotany

It is certified that error appears in the above-identified patent and that said Letters Patent is hereby corrected as shown below:

The title page should be deleted to appear as per attached title page.

Drawings sheets consisting of 2 sheets should be deleted to be replaced with attached drawing sheets.

Columns 1-8 should be deleted to be replaced with attached columns 1-8.

Signed and Sealed this

Ninth Day of February, 1993

Attest:

STEPHEN G. KUNIN

*Attesting Officer*     Acting Commissioner of Patents and Trademarks

United States Patent [19]

Dotany

[11] Patent Number: 5,083,887
[45] Date of Patent: Jan. 28, 1992

[54] HELICAL CUTTING TOOL

[75] Inventor: Amram Dotany, Kfar Sava, Israel

[73] Assignee: Abraham Cohen, Hasharon, Israel

[21] Appl. No.: 239,728

[22] Filed: Sep. 2, 1988

[30] Foreign Application Priority Data

Mar. 2, 1988 [IL] Israel ........................ 85606

[51] Int. Cl.⁵ .............................................. B26D 1/00
[52] U.S. Cl. ...................................... 407/59; 407/48; 407/58; 407/61
[58] Field of Search ....................... 407/34, 47, 48, 53, 407/56, 58, 59, 61, 62, 63

[56] References Cited

U.S. PATENT DOCUMENTS

| 2,549,251 | 4/1951 | Skelton | 407/59 |
| 4,072,438 | 2/1978 | Powers | 407/11 |
| 4,093,392 | 6/1978 | Hopkins | 407/59 |
| 4,182,587 | 1/1980 | Striegl | 407/59 |
| 4,648,755 | 3/1987 | Stashko | 407/59 |
| 4,681,485 | 7/1987 | Koelewijn | 407/59 |
| 4,708,537 | 11/1987 | Elka | 407/59 |
| 4,714,383 | 12/1987 | Shimomura | 407/59 |
| 4,790,693 | 12/1988 | Koblesky | 407/59 |

Primary Examiner—Bruce M. Kisliuk
Assistant Examiner—John Marlott
Attorney, Agent, or Firm—Benjamin J. Barish

[57] ABSTRACT

A helical cutting tool having a plurality of cutting inserts of quadrilateral configuration removably attached to seats formed in the cutting tool, with each insert including a cutting edge extending in the axial direction bounded on opposite sides by a pair of parallel, radially-extending edges. The cutting inserts are disposed in a helical array in which the cutting edge of each insert is spaced in the circumferential direction from the seat of the next adjacent insert and is in overlapping relationship in the axial direction with the cutting edge of the next adjacent insert, and in which the radially-extending edges of each insert are in overlapping relation with the radially-extending edges of the adjacent inserts, such that the cutting edges of all the inserts define a continuous, non-interrupted, cutting line of stepped configuration.

18 Claims, 2 Drawing Sheets

HELICAL CUTTING TOOL

BACKGROUND OF THE INVENTION

The present invention relates to helical cutting tools, particularly to the type having helical arrays of cutting inserts removably attached to seats formed in the cutting tool.

The conventional helical cutting tool of this type usually includes a plurality of helical arrays of cutting inserts, in which the helical angle is relatively small, being usually from 10° to 25°, and in which the cutting edge of each insert is axially spaced from the cutting edge of the next adjacent insert. The inserts of each helix are thus in staggered relationship such that two (or more) rows of inserts are necessary to produce one complete cutting edge. Accordingly, a cutting tool having four helical arrays of cutting inserts effectively produces two complete cutting edges.

In such conventional cutting tools, the cutting edges of the inserts are in direct contact with the workpiece for a relatively small proportion of the surface of the cutting tool embraced by the workpiece. For example, in a typical helical cutting tool having four helical rows of inserts disposed at a helical angle of 15°, the cutting edges of the inserts are in direct contact with the workpiece for only about 25% of the semi-cylindrical surface of the cutting tool embraced by the workpiece during the cutting operation. This results in significant chattering, hammering and vibration during the cutting operation. Moreover, it permits relatively low workpiece feed, because the workpiece feed rate depends on the number of effective complete cutting edges, rather than on the number of helical rows of cutting inserts, included in the tool.

An object of the present invention is to provide a helical cutting tool having advantages in the above respects.

BRIEF SUMMARY OF THE INVENTION

According to the present invention, there is provided a helical cutting tool having an outer surface of cylindrical configuration and a plurality of cutting inserts of quadrilateral configuration removably attached to seats cut into the outer surface of the cutting tool. Each of the seats occupies a plane extending radially of the cutting tool, and each of the inserts is removably secured in its respective seat by a fastener extending tangentially with respect to the cutting tool. Each of the inserts includes a straight cutting edge extending in the general axial direction with respect to the cutting tool and bounded on opposite sides by a pair of parallel straight edges extending radially of the cutting tool. The cutting inserts are disposed in a helical array in which the cutting edge of each insert, with respect to the cutting tool, is spaced in the circumferential direction from the seat of the next adjacent insert and is in overlapping relationship in the axial direction with the cutting edge of the next adjacent insert, and the radially-extending edges of each insert are in overlapping relation with the radially-extending edges of the adjacent inserts, such that the cutting edges of all the inserts define a continuous, non-interrupted, cutting line of stepped configuration.

In the preferred embodiment of the invention described below, each of the inserts is formed with four straight cutting edges on one side, with a base on the opposite side, and with four walls tapering inwardly from their cutting edges to their base. The cutting inserts are disposed in a helical array in which one cutting edge of each insert serves as the effective cutting edge for the respective insert when all the inserts are secured to the cutting tool, whereas the remaining cutting edges are non-effective cutting edges.

This arrangement is to be distinguished from the existing cutting tools using conventional quadrilateral inserts wherein the cutting edge of each insert is axially spaced from the seat of the next adjacent insert. This arrangement, as will be described more particularly below, is also to be distinguished from known cutting tools having triangular inserts with the cutting inserts in overlapping relation axially of the insert.

As will be described below, the novel arrangement permits the cutting inserts to be disposed and dimensioned such that their cutting edges are in direct contact with the workpiece for a very high percentage of the surface of the cutting tool embraced by the workpiece. For example, whereas in a cutting tool of conventional construction the cutting edges of the inserts are in direct contact with the workpiece for approximately 25% of the surface of the cutting tool embraced by the workpiece, in a cutting tool constructed in accordance with the present invention this percentage may be increased easily to approximately 85% of the surface of the cutting tool embraced by the workpiece. By thus providing such a large contact surface between the cutting edges and the workpiece, chatter, hammering and vibration are substantially reduced. In addition, this arrangement permits faster workpiece feed because of the higher removal rate.

This arrangement also has important advantages over the known cutting tools including triangular inserts having cutting edges in overlapping relation in the axial direction such as described in U.S. Pat. No. 4,648,755. In this known triangular insert arrangement, the inserts are relatively weak, particularly at their corners, and are easily broken or chipped. The arrangement of the present invention, however, by using quadrilateral (e.g., square or rhomboidal) inserts each having a pair of parallel radially-extending edges on opposite sides of the axially-extending cutting edge, which radially-extending edges in adjacent inserts are in overlapping relation, provides a much more durable structure.

The cutting tool constructed in accordance with the present invention also provides a number of important advantages over cutting tools having solid cutting edges, in that the chips are of reduced width (corresponding to the width of each cutting insert), thereby producing less axial load on the cutting tool, as well as permitting easier repair and maintenance of the cutting tool by merely replacing the cutting inserts whenever necessary, rather than the whole cutting tool.

According to another important feature of the invention of the present application, the inserts form a helical angle of 40-60°, which is not achievable in the conventional cutting tools having rows of staggered cutting inserts. Such a large helical angle permits faster workpiece feed.

According to a further feature in the preferred embodiment of the invention described below, the cutting edges of the cutting inserts form an inclination angle of 8-12 degrees with respect to the longitudinal axis of the tool; preferably, the inclination angle is approximately 10°. In addition, the cutting edge of each cutting insert forms a tilt angle of 15-35° with respect to the cutting edge of the next adjacent insert.

Preferably, the cutting insert is of the single-sided type, each being formed with four cutting edges on one side, with a base on the opposite side, and with four walls tapering inwardly from their cutting edges to their bases; preferably the taper is 7-15°. It will be appreciated, however, that the invention could also be advantageously used with cutting inserts of the double-sided type, wherein each is formed with four cutting edges on both sides and with straight walls joining the cutting edges of both sides.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of helical cutting tool constructed in accordance with the present invention, the cutting tool having a left-hand spiral for right-hand cutting;

FIG. 2 is a fragmentary view illustrating a similar tool but formed with a right-hand spiral for right-hand cutting;

FIG. 3 is an end view diagrammatically illustrating the disposition of the cutting inserts in the cutting tool of FIG. 1;

FIG. 4 is a projection of cutting inserts in a conventional helical cutting tool, and FIG. 4a is a diagram illustrating the relatively low percentage of the cutting edges in such a cutting tool in direct contact with the workpiece embracing the cutting tool; and FIG. 5 is a two-dimensional projection of the cutting inserts of a helical cutting tool constructed in accordance with FIG. 1 of the present application, and FIG. 5a is a diagram illustrating the relatively high percentage of the cutting edges in direct contact with the workpiece embracing the cutting tool during a cutting operation.

DESCRIPTION OF PREFERRED EMBODIMENTS

With reference to FIG. 1, there is illustrated a helical cutting tool, generally designated 2, having an outer surface of cylindrical configuration and a plurality of arrays of cutting inserts 4 removably attached by screws 6 to seats 8 formed in the cutting tool, and occupying a plane extending radially of. Preferably, a shim 10 is inserted between the base of each insert 4 and its respective seat 8. Also, a cooling hole 12 is formed through the cutting tool adjacent each of the seats 8 to dissipate the heat generated during the cutting operation.

The cutting inserts 4 are all of identical construction. They are of quadrilateral configuration, preferably square, but could also be rhomboidal. In the example illustrated in FIG. 1, they are of the single-sided, positive type, being formed with four straight cutting edges 4a on one side, a flat base 4b on the opposite side, and four tapering walls 4c tapering inwardly from their cutting edges to their bases. Preferably, the taper angle is 7-15°. While FIG. 1 illustrates the cutting inserts 4 as being of the single-sided type, it will be appreciated that they could be of the double-sided type, formed with four cutting edges on both sides and with straight walls joining the cutting edges of both sides.

FIG. 5 more particularly illustrates the side of the inserts containing the four cutting edges 4a. It will be seen that the effective cutting edge, identified as 4a-1, extends axially of the cutting tool and is bounded on opposite sides by a pair of parallel, radially-extending non-effective cutting edges 4a-2, 4a-3. It will also be seen that the radially-extending non-effective cutting edges 4a-2, 4a-3 of each insert are in overlapping relation with the radially-extending non-effective cutting edges of the adjacent inserts.

As also shown in FIG. 5, and also in FIG. 1, the effective cutting edge 4a-1 of each insert is spaced in the circumferential direction from the seat 8 of the next adjacent insert, and is in overlapping relation in the axial direction with the effective cutting edge of the next adjacent edge. The overlapping relation in the axial direction is indicated by dimension "A" in FIG. 1, and the spacing in the circumferential direction is indicated by dimension "B".

This arrangement of the cutting inserts defines a continuous, non-interrupted cutting line of stepped configuration having a helical angle (HA), which in this case is 45°.

In the arrangement illustrated in FIG. 1, the cutting edges 4a form an inclination angle (IA) of 8-12°, preferably approximately 10°, with respect to the longitudinal axis 14 of the cutting tool. As shown in FIG. 3, the cutting edge 4a of each insert forms a tilt angle (TA) of 15-35° with respect to the cutting edge of the next adjacent insert. The inclination angle IA and the tilt angle TA depend to a great extent on the material to be cut. As one example, the inclination angle IA may be approximately 10°, and the tilt angle TA may be approximately 25%.

FIG. 2 illustrates a helical cutting tool of similar construction as in FIG. 1, except that the cutting inserts are arranged to define a right-hand helix of 45%, with right-hand cutting, rather than a left-hand helix (also of 45%) with right-hand cutting illustrated in FIG. 1.

Some of the important advantages produced by the helical cutting tool of the present invention over the existing tools can be seen by comparing the diagrams of FIGS. 4 and 4a relating to tools of conventional construction, with the diagrams of FIGS. 5 and 5a relating to a tool constructed in accordance with FIG. 1 (or FIG. 2) of the present application. FIGS. 4 and 5 are two-dimensional projections of the cutting inserts in a conventional tool and in the novel tool of FIG. 1, respectively, whereas the diagrams of FIGS. 4a and 5a illustrate the respective percentages of the surfaces of the cutting tool embraced by the workpieces which are in direct contact with the workpieces. In both cases, the cutting depth, indicated by dimension "C", is 40 mm.

In the conventional cutting tool, as represented by the diagrams of FIGS. 4 and 4a, there are four helical rows $H_1$-$H_4$ of cutting inserts 14, the inserts of each row being circumferentially spaced from each other to provide a staggered relationship, such that two rows of inserts effectively produce one cutting line; thus, the four rows of inserts 14 in FIG. 4 produce two cutting lines. In FIG. 4, each helix forms a helical angle of 15°.

In the novel construction of FIG. 1, as represented by the diagrams of FIGS. 5 and 5a, each of the cutting inserts 4 is spaced in the circumferential direction by the distance "B" (FIG. 1) from the seat of the next adjacent insert, and is in overlapping relation in the axial direction, by the dimension "A" (FIG. 1) with the cutting edge of the next adjacent insert, as described above with respect to FIG. 1. In this example, there are three helixes Ha-Hc, each forming a helical angle of 45°. The diameter D of the cutting tool in both cases is the same, e.g., 40 mm.

During a cutting operation, the workpiece WP embraces the cutting tool 2 for one-half of its outer circumference, as shown in FIGS. 4a and 5a, respectively. The sectioned portion of FIG. 4a illustrates the portion of the cutting edges of the cutting inserts 14 in direct contact with the workpiece during the cutting operation when using the conventional tool of FIG. 4, whereas the sectioned portion of the diagram of FIG. 5a illustrates the portion of the cutting edges in direct with the workpiece when using the cutting tool illustrated in FIG. 1 (or FIG. 2) as represented by the diagram of FIG. 5.

Thus, when using the conventional cutting tool, it will be seen that the cutting edges of the three inserts 14 in the first helical row $H_1$ directly contact the workpiece only for an arc of 18° whereas the cutting inserts of helical row $H_2$ directly contact the workpiece only for an arc of 25°. Thus, for the 180° of embracement of the cutting tool by the workpiece, the cutting edges of the cutting tool directly contact the workpiece only for a total arc of 43°, which is approximately 25% of the total 180° of the cutting tool.

In the overlapping relationship of cutting inserts illustrated in FIG. 1 of the drawings, as represented by the diagram of FIG. 5, it will be seen that the cutting inserts 4 of helix $H_a$ are in direct contact with the workpiece for approximately 100°, and that with respect to the remaining 80° of the cutting tool embraced by the workpiece, the cutting edges of the cutting inserts in helix $H_b$ directly contact the workpiece for approximately 53°. Thus, of the 180° of the cutting tool embraced by the workpiece, the cutting edges of the cutting inserts directly contact the workpiece for approximately 153°, which is approximately 85% of the total 180° of the cutting tool embraced by the workpiece.

It will thus be seen that the construction of the cutting tool illustrated in FIG. 1 of the drawings provides a much larger contact surface between the cutting edges and the workpiece. This arrangement thus reduces chatter, hammering and vibration, and permits faster workpiece feed because of the higher rate of removal of material. Another advantage is that the arrangement permits the use of identical inserts, thereby simplifying maintenance and inventories to be kept in stock.

While the invention has been described with respect to one preferred embodiment, it will be appreciated that many variations may be made. For example, the cutting inserts could be of the double-sided type formed with four cutting edges on both sides and with straight walls joining the cutting edges of both sides, to enable the use of both sides. In addition, instead of square configuration, the cutting inserts could also be of rhomboidal. Many other variations, modifications and applications of the invention will be apparent.

What is claimed is:

1. A helical cutting tool having an outer surface of cylindrical configuration and a plurality of cutting inserts of quadrilateral configuration removably attached to seats formed in the outer surface of the cutting tool; each of said seats occupying a plane extending radially of the cutting tool, and each of said inserts being removably secured in its respective seat by a fastener extending parallel to the tangent of the cutting tool; each of the inserts including a straight cutting edge extending in the general axial direction with respect to the cutting tool and bounded on opposite sides by a pair of parallel straight edges extending radially of the cutting tool; each of said inserts being of the single-sided type, being formed with four cutting edges on one side, with a base on the opposite side, and with four walls tapering inwardly from their cutting edges to their base; said cutting inserts being disposed in a helical array in which the cutting edge of each insert, with respect to the cutting tool, is spaced in the circumferential direction from the seat of the next adjacent insert and is in overlapping relationship in the general axial direction with the cutting edge of the next adjacent insert, and the radially-extending edges of each insert are in overlapping relation with the radially-extending edges of the adjacent inserts, such that said cutting edges of all the inserts define a continuous, non-interrupted, cutting line of stepped configuration.

2. The cutting tool according to claim 1, wherein said inserts form a helical angle of 40–60°.

3. The cutting tool according to claim 1, wherein the cutting inserts are disposed and dimensioned such that their cutting edges are in direct contact with the workpiece for over 50% of the surface of the cutting tool embraced by the workpiece during a cutting operation.

4. The cutting tool according to claim 3, wherein the cutting inserts are dimensioned such that their cutting edges are in direct contact with the workpiece for approximately 85% of the surface of the cutting tool embraced by the workpiece.

5. The cutting tool according to claim 1, wherein the angle of tapering of said four walls is 7–15°.

6. The cutting tool according to claim 1, wherein said cutting inserts are all of identical configuration.

7. The cutting tool according to claim 1, further including a shim between each cutting insert and its seat.

8. The cutting tool according to claim 1, wherein a cooling hole is formed through the cutting tool adjacent its seat.

9. The cutting tool according to claim 1, wherein the cutting tool is formed with a plurality of said helical arrays of cutting inserts.

10. The cutting tool according to claim 9, wherein said helical arrays form left-hand helixes of 45°.

11. The cutting tool according to claim 9, wherein said array of cutting inserts form right-hand helixes of 45°.

12. A helical cutting tool having an outer surface of cylindrical configuration and a plurality of cutting inserts of quadrilateral configuration removably attached to seats formed in the outer surface of the cutting tool; each of said seats occupying a plane extending radially of the cutting tool, and each of said inserts being removably secured in its respective seat by a fastener extending parallel to the tangent of the cutting tool; each of the inserts including a straight cutting edge extending in the general axial direction with respect to the cutting tool and bounded on opposite sides by a pair of parallel straight edges extending radially of the cutting tool; said cutting inserts being disposed in a helical array in which the cutting edge of each insert, with respect to the cutting tool, is spaced in the circumferential direction from the seat of the next adjacent insert and is in overlapping relationship in the general axial direction with the cutting edge of the next adjacent insert, and the radially-extending edges of each insert are in overlapping relation with the radially-extending edges of the adjacent inserts, such that said cutting edges of all the inserts define a continuous, non-interrupted, cutting line of stepped configuration, the cutting edges of the cutting inserts forming an inclination angle of 8-12° with respect to the longitudinal axis of the tool.

13. The cutting tool according to claim 12, wherein the cutting edges of the cutting inserts form an inclination angle of approximately 10° with respect to the longitudinal axis of the tool.

14. A helical cutting tool having an outer surface of cylindrical configuration and a plurality of cutting inserts of quadrilateral configuration removably attached to seats formed in the outer surface of the cutting tool; each of said seats occupying a plane extending radially of the cutting tool, and each of said inserts being removably secured in its respective seat by a fastener extending parallel to the tangent of the cutting tool; each of the inserts including a straight cutting edge extending in the general axial direction with respect to the cutting tool and bounded on opposite sides by a pair of parallel straight edges extending radially of the cutting tool; said cutting inserts being disposed in a helical array in which the cutting edge of each insert, with respect to the cutting tool, is spaced in the circumferential direction from the seat of the next adjacent insert and is in overlapping relationship in the general axial direction with the cutting edge of the next adjacent insert, and the radially-extending edges of each insert are in overlapping relation with the radially-extending edges of the adjacent inserts, such that said cutting edges of all the inserts define a continuous, non-interrupted, cutting line of stepped configuration, the cutting edges of the cutting inserts forming a tilt angle of 15-35° with respect to the cutting edge of the next adjacent cutting insert.

15. A helical cutting tool having an outer surface of cylindrical configuration and a plurality of cutting inserts of quadrilateral configuration removably attached to seats formed in the outer surface of the cutting tool; each of said seats occupying a plane extending radially of the cutting tool, and each of said inserts being removably secured in its respective seat by a fastener extending parallel to the tangent of the cutting tool; each of the inserts including a straight cutting edge extending in the general axial direction with respect to the cutting tool and bounded on opposite sides by a pair of parallel straight edges extending radially of the cutting tool; said cutting inserts being disposed in a helical array in which the cutting edge of each insert, with respect to the cutting tool, is spaced in the circumferential direction from the seat of the next adjacent insert and is in overlapping relationship in the general axial direction with the cutting edge of the next adjacent insert, and the radially-extending edges of each insert are in overlapping relation with the radially-extending edges of the adjacent inserts, such that said cutting edges of all the inserts define a continuous, non-interrupted, cutting line of stepped configuration, the cutting inserts being of square configuration.

16. A helical cutting tool having an outer surface of cylindrical configuration and having a plurality of cutting inserts of quadrilateral configuration removably attached to seats formed in the outer surface of the cutting tool each of said seats occupying a plane extending radially of the cutting tool, and each of said inserts being removably secured in its respective seat by a fastener extending tangentially with respect to the cutting tool; each of the inserts being formed with four straight cutting edges on one side, with a base on the opposite side, and with four walls tapering inwardly from their cutting edges to their base; said cutting inserts being disposed in a helical array in which one cutting edge of each insert serves as the effective cutting edge for the respective insert when all the inserts are secured to the cutting tool, whereas the remaining cutting edges are non-effective cutting edges; said effective cutting edge of each insert, with respect to the cutting tool, extending in the general axial direction, being bounded on opposite sides by a pair of parallel, non-effective cutting edges extending radially of the cutting tool, being spaced in the circumferential direction from the seat of the next adjacent insert, and being in overlapping relationship in the axial direction with the cutting edge of the next adjacent insert; the radially-extending non-effective cutting edges of each insert being in overlapping relation with the effective cutting edges of the adjacent inserts, such that said effective cutting edges of all the inserts define a continuous, non-interrupted, cutting line of stepped configuration.

17. The cutting tool according to claim 16, wherein said inserts form a helical angle of 40-60°, and their cutting edges form an inclination angle of 8-12° with respect to the longitudinal axis of the tool.

18. The cutting tool according to claim 16, wherein the cutting tool is formed with a plurality of said helical arrays of cutting inserts.

* * * * *